United States Patent
Jain et al.

(10) Patent No.: US 11,695,824 B2
(45) Date of Patent: *Jul. 4, 2023

(54) OPTIMIZED INTERNET ACCESS IN A MULTI-SITE SOFTWARE-DEFINED NETWORK FABRIC

(71) Applicant: Cisco Technology, Inc., San Jose, CA (US)

(72) Inventors: Prakash Jain, Fremont, CA (US); Sanjay Kumar Hooda, Pleasanton, CA (US); Satish Kumar Kondalam, Milpitas, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 32 days.

This patent is subject to a terminal disclaimer.

(21) Appl. No.: 17/397,269

(22) Filed: Aug. 9, 2021

(65) Prior Publication Data

US 2021/0368004 A1 Nov. 25, 2021

Related U.S. Application Data

(63) Continuation of application No. 16/737,964, filed on Jan. 9, 2020, now Pat. No. 11,128,694.

(51) Int. Cl.
*H04L 67/10* (2022.01)
*H04L 45/44* (2022.01)

(52) U.S. Cl.
CPC .............. *H04L 67/10* (2013.01); *H04L 45/44* (2013.01)

(58) Field of Classification Search
CPC ................................ H04L 67/10; H04L 45/44
See application file for complete search history.

(56) References Cited

U.S. PATENT DOCUMENTS 9,450,836 B2 9/2016 Hammer et al.
2008/0130627 A1 6/2008 Chen et al.
(Continued)

FOREIGN PATENT DOCUMENTS

WO 2019138415 A1 7/2019

OTHER PUBLICATIONS

Jain, P. et al., "LISP Site External Connectivity draft-jain-lisp-site-external-connectivity-00", Network Working Group, Oct. 23, 2019, 5 pages.

*Primary Examiner* — Frantz B Jean
(74) *Attorney, Agent, or Firm* — Edell, Shapiro & Finnan, LLC

(57) ABSTRACT

Presented herein are techniques to provide an endpoint in a multi-site Software-defined network (SDN) fabric with an Internet access route that is optimal for the specific site in which the endpoint is located. In particular, a control plane node in a first site of a multi-site SDN fabric registers a border node in the first site as a Default Egress Tunnel Router (ETR) for Internet access or unknown endpoint identifier (EID) of the first site. The first site includes at least one endpoint. The control plane node receives a request for Internet access for the at least one endpoint and provides a dynamically-selected Internet access route via a same or different virtual instance (e.g., Virtual Routing and Forwarding (VRF) function(s), Virtual Private Network(s) (VPNs), Virtual Networks (VNs), etc.) for Internet traffic sent by the at least one endpoint.

20 Claims, 6 Drawing Sheets

(56) References Cited

U.S. PATENT DOCUMENTS

| | | | |
|---|---|---|---|
| 2013/0067173 A1* | 3/2013 | Pangborn | H04L 63/06 711/149 |
| 2016/0261493 A1 | 9/2016 | Li | |
| 2017/0142226 A1* | 5/2017 | De Foy | H04L 67/104 |
| 2018/0367459 A1* | 12/2018 | Chandrasekaran | H04L 47/20 |
| 2019/0190823 A1 | 6/2019 | Means | |
| 2021/0151056 A1* | 5/2021 | Trim | H04L 47/821 |

* cited by examiner

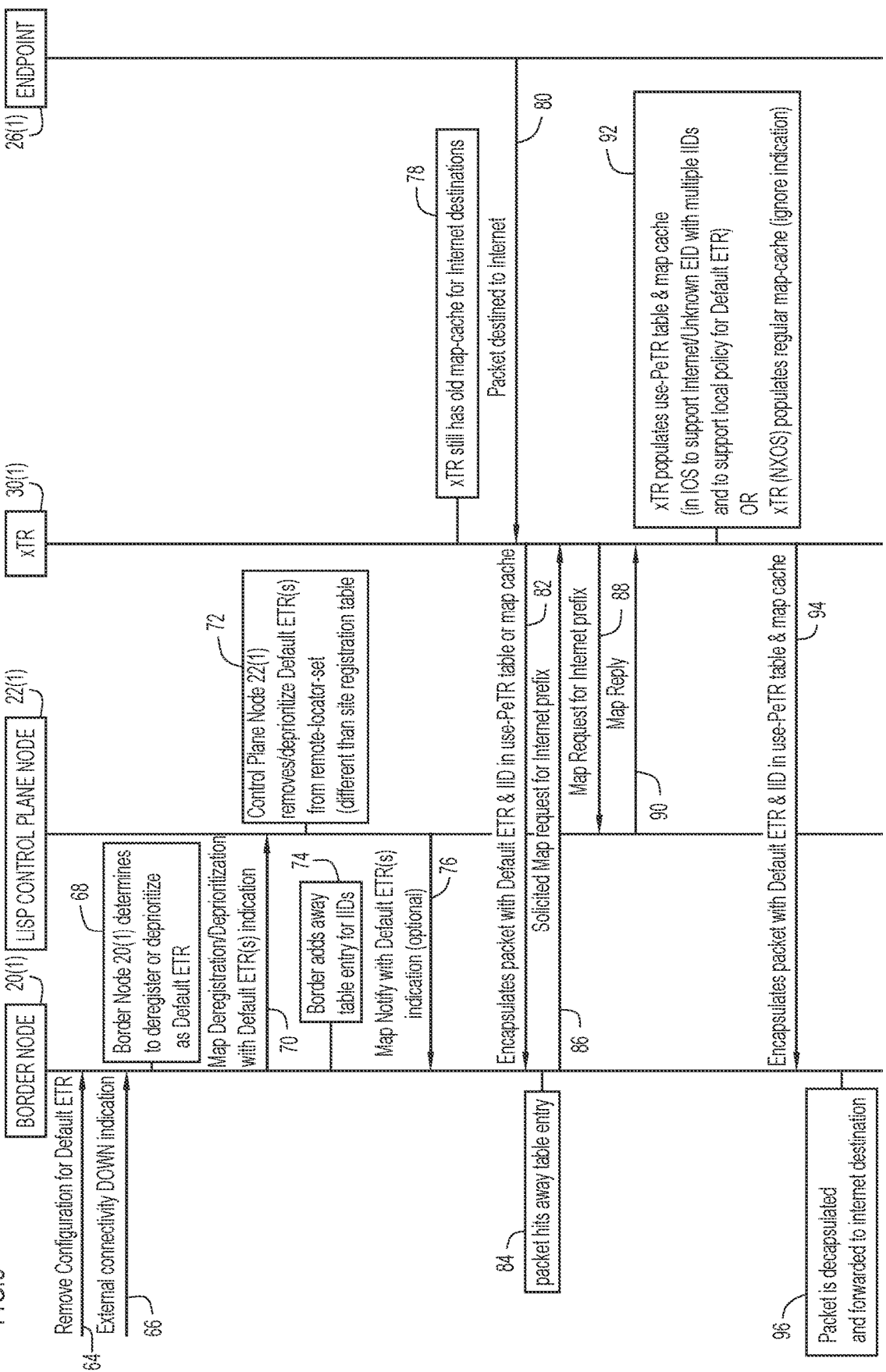

400

402 REGISTERING A BORDER NODE IN THE FIRST SITE AS A DEFAULT EGRESS TUNNEL ROUTER (ETR) FOR AVAILABILITY OF THE INTERNET OR AN UNKNOWN ENDPOINT IDENTIFIER (EID) REACHABILITY PATH OF THE FIRST SITE, WHEREIN THE FIRST SITE INCLUDES AT LEAST ONE ENDPOINT

404 RECEIVING A REQUEST FOR THE INTERNET ACCESS FOR THE AT LEAST ONE ENDPOINT

406 PROVIDING A DYNAMICALLY-SELECTED INTERNET ACCESS ROUTE FOR INTERNET TRAFFIC SENT BY THE AT LEAST ONE ENDPOINT

OPTIMIZED INTERNET ACCESS IN A MULTI-SITE SOFTWARE-DEFINED NETWORK FABRIC

CROSS REFERENCE TO RELATED APPLICATION

This application is a continuation of U.S. patent application Ser. No. 16/737,964, filed Jan. 9, 2020 and issued as U.S. Pat. No. 11,128,694, the entirety of which is incorporated herein by reference.

TECHNICAL FIELD

The present disclosure relates to optimized Internet access in a multi-site software defined network fabric.

BACKGROUND

Software-defined networking is a set of networking principles governed by the goals of creating a dynamic, flexible, and scalable network through software-based management and configuration. A software-defined network (SDN) is designed to make a network flexible and agile, by allowing users to design, build, and manage networks with separate control and forwarding planes. As a result, the control plane is directly programmable, and it abstracts the underlying infrastructure for applications and network services. For example, the Software-Defined Access (SD-Access) solution provided by Cisco® is an intent-based networking solution built on the principles of Cisco's Digital Network Architecture (DNA). Cisco is a registered trademark of Cisco Technology, Inc.

BRIEF DESCRIPTION OF THE DRAWINGS

FIG. 3 is a flow diagram illustrating deregistration of a border node as a default ETR and associated operations in a multi-site SDN fabric, in accordance with certain embodiments presented herein.

FIG. 4 is a flowchart of a method, in in accordance with certain embodiments presented herein.

DESCRIPTION OF EXAMPLE EMBODIMENTS

Overview

Presented herein are techniques to provide an endpoint in a multi-site Software-defined network (SDN) fabric with an Internet access route that is optimal for the specific site in which the endpoint is located. In particular, a control plane node in a first site of a multi-site SDN fabric registers a border node in the first site as a Default Egress Tunnel Router (ETR) for Internet access or an unknown endpoint identifier (EID) of the first site. The first site includes at least one endpoint. The control plane node receives a request for Internet access for the at least one endpoint and provides a dynamically-selected Internet access route via a same or different virtual instance (e.g., Virtual Routing and Forwarding (VRF) function(s), Virtual Private Network(s) (VPNs), Virtual Networks (VNs), etc.) for Internet traffic sent by the at least one endpoint.

Example Embodiments

Figure 1:
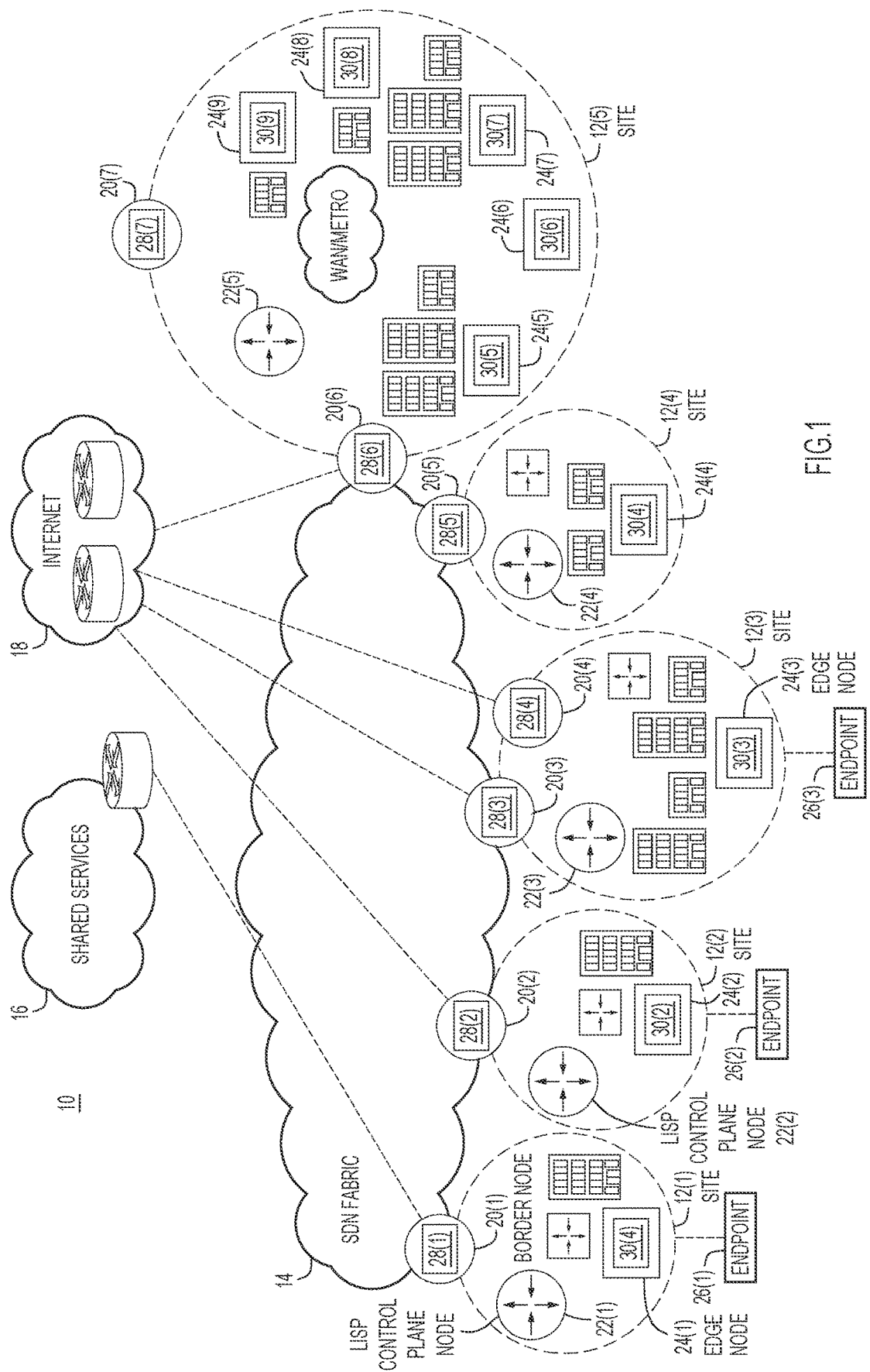
FIG. 1 is a schematic diagram illustrating a multi-site software-defined network (SDN) fabric, in accordance with certain embodiments presented herein.

Software-defined networking utilizes separate control and forwarding planes to provide users with a dynamic, flexible, and scalable network fabric. In certain arrangements, a Software-Defined Network (SDN) architecture can be extended across multiple different physical locations (sites) to provide a multi-site (multisite) SDN fabric that may be used to, for example, provide Internet access to different endpoints at the different sites. FIG. 1 is schematic diagram of an example multi-site network 10 having five (5) different sites, referred to as sites 12(1), 12(2), 12(3), 12(4), and 12(5). Each of the sites 12(1), 12(2), 12(3), 12(4), and 12(5) may represent, for example, a different physical location that are interconnected via the multi-site SDN fabric 14. Also shown in FIG. 1 is a shared services cloud 16, representing services that may be shared by endpoints attached to the different sites 12(1)-12(5) via the multi-site SDN fabric 14. As described further below, the multi-site SDN fabric 14 also enables endpoints connected to the different sites 12(1)-12(5) to access the Internet, which is schematically shown in FIG. 1 at reference numeral 18.

Each of the sites 12(1)-12(5) include at least one border node 20 (e.g., border router or router), which is the entry and exit point for site traffic to/from the multi-site SDN fabric 14 (i.e., where the sites connect to the shared services cloud 16, Internet 18, etc., via the multi-site SDN fabric 14). In the example of FIG. 1, site 12(1) includes a border node 20(1), site 12(2) includes a border node 20(2), and site 12(3) includes two border nodes, referred to as border nodes 20(3) and 20(4). Similarly, site 12(4) includes a border node 20(5), while site 12(5) includes two border nodes, referred to as border nodes 20(6) and 20(7).

In the example of FIG. 1, the sites 12(1)-12(5) utilize the Locator ID Separation Protocol (LISP). LISP is a network architecture and protocol that implements the use of two namespaces instead of a single Internet Protocol (IP) address, namely endpoint identifiers (EIDs) assigned to endpoint devices (endpoints or hosts) and routing locators (RLOCs) assigned to devices (primarily routers) that make up the global routing system. Splitting EID and RLOC functions yields several advantages including improved routing system scalability, and improved multihoming efficiency and ingress traffic engineering. As such, the border nodes 20(1)-20(7) each function as a LISP Egress Tunnel Routers (ETR) and as a LISP Ingress Tunnel Router (ITR).

An ETR connects a site to the LISP-capable part of a core network (such as the Internet), publishes EID-to-RLOC mappings for the site, responds to Map-Request messages, and decapsulates and delivers LISP-encapsulated user data to end systems at the site. During operation, an ETR sends periodic Map-Register messages to all its configured map servers. The Map-Register messages contain all the EID-to-RLOC entries for the EID-numbered networks that are connected to the ETR's site. An ETR that receives a Map-Request message verifies that the request matches an EID for which it is authoritative, constructs an appropriate Map-Reply message containing its configured mapping information, and sends this message to the ingress tunnel router (ITR) whose RLOCs are listed in the Map-Request message. An ETR that receives a LISP-encapsulated packet that is directed to one of its RLOCs decapsulates the packet, verifies that the inner header is destined for an ED-numbered end system at its site, and then forwards the packet to the end system using site-internal routing.

An ITR is responsible for finding EID-to-RLOC mappings for all traffic destined for LISP-capable sites. When the ITR receives a packet destined for an EID, it first looks for the EID in its mapping cache. If the ITR finds a match, it encapsulates the packet inside a LISP header with one of its RLOCs as the IP source address and one of the RLOCs from the mapping cache entry as the IP destination. The ITR then routes the packet normally. If no entry is found in the ITR's mapping cache, the ITR sends a Map-Request message to one of its configured map resolvers and then discards the original packet. When the ITR receives a response to its Map-Request message, it creates a new mapping cache entry with the contents of the Map-Reply message. When another packet, such as a retransmission for the original and, now, discarded packet arrives, the new mapping cache entry is used for encapsulation and forwarding.

In addition to a border node 20, each site 12(1)-12(5) also includes at least one LISP control plane node 22, sometimes referred to as a LISP Map-Resolver and Map-Server (LISP MSMR), where the map resolver (MR) and map server (MS) may be implemented at the same or different devices or nodes. For ease of description, the term LISP control plane node will be used to generally refer to the control plane entities within the sites 12(1)-12(5).

In the example of FIG. 1, site 12(1) includes a LISP control plane node 22(1), site 12(2) includes a LISP control plane node 22(2), site 12(3) includes a LISP control plane node 22(3), site 12(4) includes a LISP control plane node 22(5), and site 12(4) includes LISP control plane node 22(5). It is to be appreciated that the use of only one LISP control plane node in each of the sites 12(1)-12(5) is merely illustrative and that, in certain examples, a site may have multiple LISP control plane nodes.

In the LISP arrangement of FIG. 1, the border nodes 20(1)-20(7) include corresponding Proxy Ingress Tunnel Routers (PiTR) and Proxy Egress Tunnel Routers (PeTR), each implemented as a proxy tunnel router (PxTR). That is, a PxTR is an entity that functions as both a PiTR and as a PeTR. As such, as shown in FIG. 1, border nodes 20(1), 20(2), 20(3), 20(4), 20(5), 20(6), and 20(7) each include a corresponding PxTR 28(1), 28(2), 28(3), 28(4), 28(5), 28(6), and 28(7), respectively. In general, a PxTR enables the EID space of the sites to communicate with the external RLOC space and, conversely, enables the external RLOC space to communicate with the EID space (i.e., a mechanism to allow networking elements not actively participating in LISP to communicate with the EID space, and vice versa).

Each site 12(1)-12(5) also includes at edge node 24 (e.g., switch or router), to which endpoint devices (endpoints or hosts) connect. In the example of FIG. 1, site 12(1) includes an edge node 24(1), site 12(2) includes an edge node 24(2), site 12(3) includes an edge node 24(3), and site 12(4) includes an edge node 24(4). Site 12(5) includes a plurality of edge nodes, referred to as edge nodes 24(5), 24(6), 24(7), 24(8), and 24(9). It is to be appreciated that a site could include different numbers of edge nodes than that shown in FIG. 1.

The endpoints that connect to the edge nodes 24(1)-24(9) may be, for example, mobile devices (e.g., mobile phones, tablet computers, etc.), computers (e.g., desktops, laptops, etc.), or another physical or virtual device. For ease of illustration, only four endpoint devices are shown in FIG. 1, namely a first endpoint device 26(1) connected to edge node 24(1) in site 12(1), namely a second endpoint device 26(2) connected to edge node 24(2) in site 12(2), a third endpoint device 26(3) connected to edge node 24(3) in site 12(3), and a fourth endpoint device 26(4) connected to edge node 24(4) in site 12(4). It would be appreciated that different numbers of endpoint devices may be connected at the edge devices in any of the sites 12(2)-12(5).

The LISP EID namespace represents customer end sites in the same way that end sites are defined in non-LISP environments except that the IP addresses used within these LISP sites are not advertised within the non-LISP Internet (RLOC namespace). Instead, end-customer LISP functionality is deployed exclusively on customer endpoint routers (e.g., edge nodes), which perform both the egress tunnel router (ETR) and ingress tunnel router (ITR) functions of a LISP device. Collectively, the egress tunnel router (ETR) and ingress tunnel router (ITR) functions are referred to as an "xTR." Therefore, as shown in FIG. 1, each of the edge nodes 24(1)-24(9) includes a corresponding xTR 30(1)-30(9).

In the addition to the above elements, the sites 12(1)-12(5) may also include transit control plane nodes to facilitate inter-site communication via the multi-site SDN fabric 14. For ease of description, these transit control plane nodes have been omitted from FIG. 1.

In a multi-site SDN fabric, there may be multiple paths for the endpoint devices to access the Internet (i.e., each site has a plurality of available Internet access routes). For example, in FIG. 1, border nodes 20(1), 20(2), 20(3), 20(4), and 20(6) all provide for access to the Internet 18 (e.g., provide Internet access to endpoint devices). In certain examples, the Internet access route provided or offered to an endpoint device may be "direct" or "local" Internet access, meaning that the border node in the same site provides Internet access without tunneling through a second site. In FIG. 1, endpoint devices 26(1), 26(2), and 26(3) all have direct (local) Internet access via the border nodes 20(1), 20(2), and 20(3), respectively. In other examples, the Internet access provided/offered to an endpoint device may be "indirect" or "remote" Internet access, meaning that the border node in the same site only provides Internet access by tunneling through a second site. In FIG. 1, endpoint device 26(4) has indirect (remote) access because border node 20(5) accesses the Internet via a tunnel through another site, such as site 12(5). A border node with direct Internal may be referred to having a "direct" Internet connection, while a border node with only indirect Internet access may be referred to as having an "indirect" Internet connection. In certain examples, the border nodes may have multiple Internet connections (e.g., one primary direct connection and one or more redundant/backup indirect connections). That is, a plurality of Internet access routes may exist for Internet traffic (packets) from a given site.

In certain arrangements, multiple Internet access routes/paths exist for Internet access (e.g., either local or remote) and, at the same time, there is a path to transit network towards remote sites through the same border (PxTR). In such an arrangement it becomes difficult to determine the optimal/optimized Internet access route (e.g., which border node should be used to access the Internet), with the correct priority order, from an individual site, while maintaining the optimized transit network path towards the remote sites from that site. As used herein, and as described further below, an optimal/optimized Internet access route or path is generally a connection to the Internet that minimizes the requirement for tunneling through a second site. As such, an operational direct Internet access route (i.e., Internet access directly through the local border node) is considered preferable and "optimal" to an indirect Internet connection (i.e., Internet access indirectly through a remote border node). However, as described further below, the optimal/optimized Internet access path, sometimes referred to herein as a "dynamically-selected Internet access route," may be based on other site-specific Internet access information.

There are several reasons why, in conventional arrangements with multiple available Internet access routes from a site, it is difficult to ensure optimal Internet access across the SDN fabric. First, Internet traffic and transit network traffic usually take the same default exit path within a site. Second, the configured (predetermined) priorities and weights of the RLOCs used for the PeTRs to go to the Internet/default exit are usually statically configured across all sites. That is, in conventional arrangements, Internet access route has associated pre-configured priority information (i.e., predetermined) priorities and weights of the RLOCs) that is static for all of the sites (i.e., the same across all of the sites).

For example, Table 1, below illustrates example static pre-configured priority information, sometimes referred to herein as a "configured RLOC priority," for each of the border nodes 20(1)-20(7) (e.g., for PxTRs 28(1)-28(7)) in a conventional arrangement. In Table 1, a lower configured RLOC priority value indicates a relatively higher priority order (e.g., priority 10 is the highest priority order and priority 70 is the lowest priority order).

TABLE 1

| Border Node | 20(1) | 20(2) | 20(3) | 20(4) | 20(5) | 20(6) | 20(7) |
|---|---|---|---|---|---|---|---|
| Configured RLOC Priority Information | 30 | 10 | 20 | 50 | 70 | 60 | 40 |

As noted, the configured RLOC priorities, as shown in Table 1, are statically configured values (i.e., do not change) and, in conventional arrangements, these values are also the same for all of the sites in the network (i.e., border node 20(1) has the same configured priority of 30, across sites 12(1)-12(5)). While the above configured RLOC priorities and corresponding weights (collectively referred to as pre-configured priority information) can provide an optimized Internet access route/path from one site of the multi-site SDN fabric 14, the use of the same configured priority and weights may not result in the selection of the optimal Internet access route from another site. For example, in a conventional implementation of FIG. 1, since border node 20(2) has the highest priority, endpoint device 26(2) has optimal Internet access via border node 20(2) (i.e., a direct Internet access route via border node 20(2)) because Internet traffic from endpoint device 26(2) will exit directly to the Internet via border node 20(2). However, again in a conventional implementation of FIG. 1, endpoint device 26(3), for example, does not have optimal Internet access (i.e., a sub-optimal Internet access route) because Internet traffic from endpoint device 26(3) will not exit directly via border node 20(3). Instead, since the priority of border node 20(2) is higher than the priority of border node 20(3) (i.e., 10 versus 20), Internet traffic from endpoint device 26(3) will tunnel from border node 20(3) to border node 20(2), then exit to the Internet (i.e., traffic from endpoint device 26(3) flows via an indirect connection, even though a direct connection is available via the site at border node 20(3)). Endpoint devices connected at other sites, such as endpoint device 26(1), experience a similar problem. As such, the use of pre-configured (fixed) priority information (i.e., configured RLOC priorities and associated weights) does not provide for the selection of an optimal/optimized Internet access route for all endpoints (users) in all sites of a multi-site SDN fabric. Internet traffic from a site that flows through an indirect connection even though a direct connection is already available at that site is not only inefficient, but can also lead to, for example, congestion, Internet connectivity disruptions, etc.

Accordingly, when multiple Internet access routes are available at a site, the techniques presented herein dynamically reprioritize the plurality of Internet access routes to identify an optimized Internet access route for the first site, irrespective of the pre-configured priority information (e.g., determine the optimized Internet access path/route from a given site in the multi-site SDN fabric, independent from the pre-configured priority information, so that, for the given site, the Internet traffic will flow through an available direct Internet connection, rather than an indirect Internet connection dictated by configured PeTR/RLOC priority values). In other words, the techniques presented herein enable each site connected to an SDN fabric to dynamically select which of a plurality of available Internet connections endpoints within the site should use for Internet access, regardless of the configured RLOC priority values set for the SDN fabric. As a result, endpoints within a given site will be offered, by the control plane, an optimal Internet access route (dynamically-selected Internet access route) that is dynamically determined based on "site-specific Internet access information," as opposed to only the static pre-configured priority information (configured RLOC priority information) (i.e., customizing the Internet access route for the requestor site).

The site-specific Internet access information used to determine the dynamically-selected Internet access route may include, for example, an indication of whether each of the plurality of Internet access routes is associated with a direct Internet connection from the border node or an indirect Internet connection from the border node. The site-specific Internet access information may also include, border node status information and/or Operation, Administration, and Maintenance (OAM) parameters associated with each of plurality of Internet access routes (e.g., indications of path loss, delays, congestion, etc. associated with each Internet access route).

In accordance wither certain embodiments presented herein, dynamically adjustable priority values and associated weights), collectively referred to herein as "dynamic RLOC priority information" or "dynamic path cost" of multiple border routers (PeTRs) is computed. Using the dynamic path cost, devices in the multi-site fabric can determine the optimal Internet access path based on its location, with respect to the Internet access provider PeTR (or PxTR). In addition, the techniques presented herein ensure that when a priority RLOC for an exit (such as Internet route) goes down or changes, the cross site communication priority RLOC path is still maintained (i.e., when the Internet path priority changes based on the availability of Internet routes, the techniques presented herein ensure that the remote site access path remains optimized/unchanged).

Figure 2:
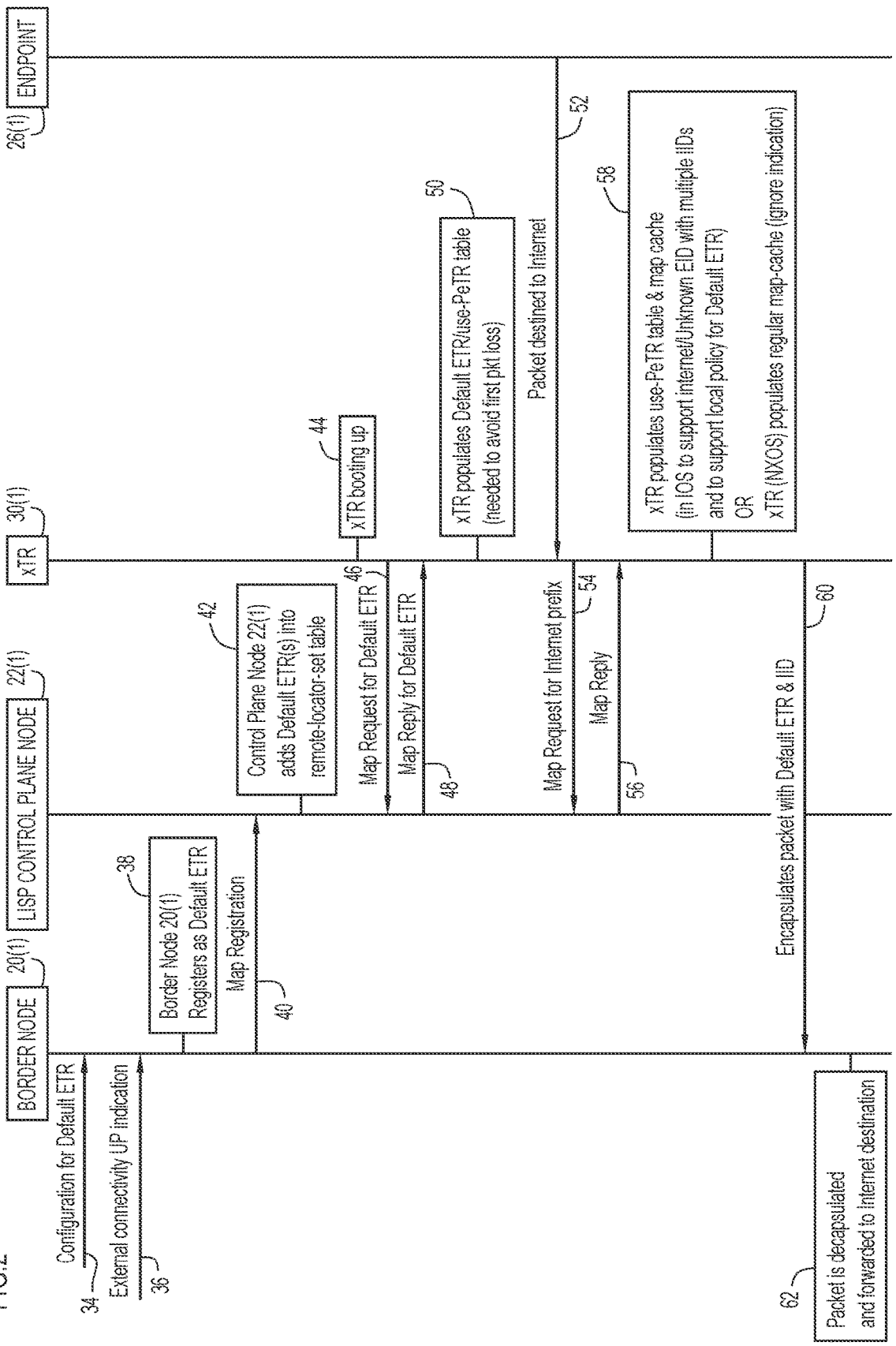
FIG. 2 is a flow diagram illustrating registration of a border node as a default Egress Tunnel Router (ETR) and associated operations in a multi-site SDN fabric, in accordance with certain embodiments presented herein.

In certain examples, the techniques presented herein provide different default/specific border (RLOC or PeTR) priority path registrations mechanisms towards the local site control plane and the transit control plane with the ability to apply dynamic path selection for optimized Internet access and cross site communication. FIG. 2 is a flow diagram illustrating separate border registration mechanisms to the local and transit control plane to separate out the Internet access path from the cross site communication path (e.g., LISP border convergence with Default ETR (unknown EID) registration). FIG. 3 is a flow diagram that includes dynamic deregistration of PxTRs as the Internet provider of the LSIP fabric path (e.g., LISP border convergence with Default ETR (unknown EID) deregistration). For ease of description, FIGS. 2 and 3 will be described with reference to specific elements in FIG. 1, namely border node 20(1), PxTR 28(1), LISP control plane node 22(1), edge node 24(1), endpoint device (host) 26(1), and xTR 30(1) at site 12(1).

Referring first to FIG. 2, this flow may occur, for example, when border node 20(1) obtains Internet connectivity. The registration process informs the LISP control plane node 22(1) (MSMR) that this border node 20(1) has external connectivity to the Internet.

In particular, the flow of FIG. 2 begins, as indicated by arrow 34, where the border node 20(1) obtains (e.g., receives) a configuration for a default ETR (i.e., unknown EID). As indicated by arrow 36, the border node 20(1) also obtains an external (Internet) connectivity "UP" indication (e.g., receives an indication that the border node 20(1) has a first or new Internet connectivity path).

At 38, the border node 20(1) determines whether it will register as the default ETR for site 12(1). In other words, since the EID is unknown, at 38 the border node 20(1) registers at the Internet connection provider for all external Internet traffic for the site (e.g., not a specific host/endpoint registration). This determination is based on the configuration and the external connectivity status.

When the border node 20(1) determines it will register as the default ETR, the border node 20(1) performs Map registration with the LISP control plane node 22(1), including with default ETR(s) indication (e.g., in specific IID or at service level). This is represented in FIG. 2 by arrow 40. At 42, the LISP control plane node 22(1) adds the default ETR(s) into a remote-locator set table, which is different from the site registration table.

As noted above, the site 12(1) may have a plurality of Internet access routes available (e.g., direct and indirect routes). Each of these Internet access routes has associated pre-configured priority information (e.g., as shown in Table 1, above) that could prevent the border node 20(1) from providing a direct Internet access route to endpoints in the site 12(1). As such, the LISP control plane node 22(1) may be configured to analyze the plurality of Internet access routes from the site 12(1) and dynamically reprioritize the plurality of Internet access routes based on site-specific Internet access information to identify a dynamically-selected Internet access route (e.g., optimized Internet access route) for the site 12(1) irrespective of the pre-configured priority information.

At 44, the xTR 30(1) boots up and, as shown by arrow 46, sends a Map Request for the Default ETR to the LISP control plane node 22(1), which is needed to avoid first packet loss. As shown by arrow 48, the LISP control plane node 22(1) sends a Map Reply indicating the Default ETR to the xTR 30(1). At 50, the xTR 30(1) populates the Default ETR in a use-petr table, which is again needed to avoid first packet loss.

As illustrated by arrow 52, the xTR 30(1) receives a packet directed/destined to the Internet from the endpoint device 26(1). That is, the xTR 30(1) receives an Internet packet from the endpoint device 26(1). In response, as illustrated by arrow 54, the xTR 30(1) sends a request for Internet access for the endpoint device 26(1). In this specific implementation, the xTR 30(1) sends a Map Request for the internet prefix to the LISP control plane node 22(1). As shown by arrow 56, in response to receipt of the Map Request, the LISP control plane node 22(1) sends a Map Reply back to the xTR 30(1). The Map Reply, sometimes referred to herein as an "Unknown EID Map Reply" includes an EID that is the same as the NMR hole prefix. In addition, the Unknown EID Map Reply" includes RLOCs as list of Default ETRs and 15 min TTL Time to Live (TTL), which is the same as the NMR TTL. In other words, the LISP control plane node 22(1) provides the xTR 30(1) (edge node 24(1)) with dynamically-selected Internet access route (e.g., optimized Internet access route) offer through the border node 20(1), wherein the dynamically-selected Internet access route is dynamically determined based on site-specific Internet access information, as opposed to only the static pre-configured priority information (configured RLOC priority information).

In accordance with the above, when the destination EID is not known to the LISP control plane node 22(1) (i.e., Map-server), the control plane node computes a prefix range which does not cover/overlap with any of the known prefixes at the LISP control plane node 22(1). This is usually called a 'hole' and the LISP control plane node 22(1) replies to the requesting xTR 30(1) with this hole prefix. The xTR 30(1) enters this hole prefix as the destination EID into its map-cache with PeTR as the RLOC. Earlier this negative map reply (NMR) did not have any associated 'RLOC' or PeTR information since PeTR used to be statically configured at xTR/ITR. With PeTR registration mechanism as described herein, the LISP control plane node 22(1) will reply with the Unknown EID Map Reply having hole prefix and PeTR information, which makes it possible to change PeTR(s) dynamically based on optimum interest access path calculated/derived. In other words, the Unknown EID Map Reply in accordance with embodiments presented herein is sometimes referred to herein as being a "special" Map Reply including a hole prefix and PeTR information (i.e., hole prefix+PeTR), rather than a "regular" Map Reply that includes EID prefix and RLOC (i.e., EID prefix+RLOC).

Moreover, the TTL (timeout) for a map-cache after which the map-cache tries to refresh itself (i.e., it sends map-request to map-server in case it has updated path (RLOC) or updated PeTR information to send back in map-reply). As such, the xTR 30(1) keeps its map-caches up to date with any change on map-server.

At 58, using the Unknown EID Map Reply, the xTR 30(1) populates the map cache. In certain examples, the xTR 30(1) populates the map cache and the use-petr table (e.g., in IOS to support Internet/unknown EID with multiple IIDs and to support local policy for Default ETR). In other examples, the xTR 30(1) populates the map cache while ignoring an indication in the Unknown EID Map Reply (i.e., hole prefix+PeTR message). That is, the Unknown EID Map Reply (hole prefix+PeTR message) can have a special indication to indicate that it is a special map-reply. If this special mechanism is not known to any xTR/ITR (possibly from a different vendor), then that xTR/ITR can treat this Unknown EID Map Reply as a regular map reply (EID prefix+RLOC) and install it as usual in the map-cache, while ignoring the special indication (i.e., no special handling is applied and, instead, PeTR, local policy preferential treatment, etc. may be used).

As shown by arrow 60, the xTR 30(1) encapsulates the Internet packet with the Default ETR and IID (e.g., in the map-cache and/or use-petr table) and sends the encapsulated Internet packet to the border node 20(1). At 62, the border node 20(1) decapsulates the encapsulated Internet packet and forwards/sends the Internet packet to the target Internet destination.

It is to be appreciated that, in certain arrangements, each site 12(1)-12(5) may have a different virtual instance (e.g., different Virtual Routing and Forwarding (VRF) function(s), different Virtual Private Network(s) (VPNs), Virtual Networks (VNs), etc.). It is to be noted that, even if the backup Internet access route is via, for example, a different VRF, the VRF can be identified during the registration (i.e., the techniques still operate across different VRFs).

As noted above, FIG. 3 is a flow diagram illustrating dynamic deregistration of PxTRs as the Internet provider of the LSIP fabric path (e.g., LISP border convergence with Default ETR (unknown EID) deregistration). In particular, FIG. 3 illustrates operations performed when the optimal Internet access route goes down (i.e., Internet connectivity is lost) and the route needs to be changed.

In particular, the flow of FIG. 3 begins, as indicated by arrow 64, where the border node 20(1) obtains (e.g., receives) an indication to remove the configuration for the default ETR. As indicated by arrow 66, the border node 20(1) also obtains an external (Internet) connectivity "DOWN" indication (e.g., receives an indication that the border node 20(1) has lost its Internet connectivity path).

At 68, the border node 20(1) determines whether it will deregister (deconfig) or deprioritize as the default ETR for site 12(1). This determination is based on the configuration and the external connectivity status. When the border node 20(1) determines it will deregister or deprioritize as the default ETR, border node 20(1) adds a blocking entry (e.g., 0.0.0.0/0) in the away table entry in IID for which it is the default ETR. Additionally, the border node 20(1) performs Map deregistration/deprioritization with the LISP control plane node 22(1), including with default ETR(s) indication (e.g., in specific IID or at service level). This is represented in FIG. 3 by arrow 70. At 72, the LISP control plane node 22(1) removes/deprioritizes the default ETR(s) from the remote-locator set table, again which is different from the site registration table.

At 74, the border node 20(1) adds an away table entry for IIDs. At 76, the LISP control plane node 22(1) optionally sends a Map Notify message with Default ETR(s) indication to the border node 20(1).

As shown at 78, the xTR 30(1) has the old map-cache for the Internet (e.g., via border node 20(1)). As shown by arrow 80, the xTR 30(1) receives an Internet packet from the endpoint device 26(1). In response, as illustrated by arrow 84, since the xTR 30(1) has the old map-cache for the Internet, the xTR 30(1) encapsulates the Internet packet with the Default ETR and IID (e.g., in the map-cache and/or use-petr table) and sends the encapsulated Internet packet to the border node 20(1). However, when the Internet packet reaches the border node 20(1), the packer will hit the blocking entry (e.g., 0.0.0.0/0) in the away table entry. Therefore, in response, the border node 20(1) sends a Solicited Map request for the Internet prefix to the xTR 30(1). This is shown in FIG. 3 by arrow 86.

As illustrated by arrow 88, the xTR 30(1) sends a Map Request for the internet prefix to the LISP control plane node 22(1). As shown by arrow 90, in response to receipt of the Map Request, the LISP control plane node 22(1) sends a Map Reply back to the xTR 30(1). The Map Reply includes an EID that is the same as the NMR hole prefix. In addition, the Map Reply includes RLOCs as updated list of Default ETRs and 15 min TTL, which is the same as NMR TTL, and the Default ETR indication.

At 92, using the Map Reply, the xTR 30(1) updates the map cache. In certain examples, the xTR 30(1) updates the map cache and the use-petr table (e.g., in IOS to support Internet/unknown EID with multiple IIDs and to support local policy for Default ETR). In other examples, the xTR 30(1) updates the map cache while ignoring the indication.

As shown by arrow 94, the xTR 30(1) encapsulates the Internet packet with the Default ETR and IID (e.g., in the map-cache and/or use-petr table) and sends the encapsulated Internet packet to the border node 20(1). At 94, the border node 20(1) decapsulates the encapsulated Internet packet and forwards/sends the Internet packet to the target Internet destination.

In FIGS. 2 and 3, when the Map Request is generated and reaches the LISP control plane node 22(1), the LISP control plane node 22(1) determines that the packet is destined to the Internet (e.g., does not find a match in available prefixes). In response, the LISP control plane node 22(1) replies by adjusting the priority and weights of the RLOCs in the Map reply (i.e., dynamically reprioritizing the plurality of Internet access routes). The LISP control plane node 22(1) determines a correct priority and weights to return in the Map reply using multiple parameters supplied by the border node 20(1) while registering the border as the default ETR. These parameters could be, for example, location, path distance, delay/loss counts, or other OAM parameters, health/performance statistics of the border for the Internet and cross site paths, etc.

Also, the border node 20(1) (PeTR) can decide to do multiple registration/deregistration separately to local and transit control plane using any of the following different mechanisms for default-ETR origination:
- PeTR having specific Internet routing information base (RIB) route availability (e.g., 0.0.0.0 route for Internet, specific subnet route for another site or another control plane, etc.);
- PeTR having map-cache towards other border which has specific Internet RIB route availability (e.g., 0.0.0.0 route for Internet, specific subnet route for another site or another control plane, etc.);
- PeTR having any static configuration for default-ETR origination;
- PeTR having any operational-state criteria for default-ETR origination; or
- PeTR having any control-protocol state/parameter (e.g., BGP community, LISP site, internal/external border, etc.) criteria for default-ETR origination.

In the event a LISP control plane node does not have information about a remote site's subnets, the edge traffic can be sent to the border node to regenerate a Map request for the transit control plane to separate out the Internet and cross site paths. The transit control plane will have all information about the RLOCs, with reachability to different site subnets as well the Internet. An additional enhancement could be done on the border node to specify the control plane (local or transit), while registering Default ETR as well as installing map-cache to generate map-request. For example, the 'map-cache <prefix> map-request' & 'database-mapping <prefix> default-etr' command line interfaces could be extended to include: [map-server <local-msmr-address/transit-msmr-address>].

FIGS. 2 and 3 illustrate default/specific border (RLOC or PeTR) priority path registrations and deregistration mechanisms, respectively, towards the local site control plane and the transit control plane with the ability to apply dynamic path selection for optimized Internet access and cross site communication. That is, using the above mechanisms shown in FIGS. 2 and 3, a border node (PeTR) can dynamic registers/deregisters itself to local/transit control plane for Internet and cross site connectivity so that selecting an optimal path for Internet traffic will not impact cross site connectivity, and vice versa.

The techniques presented herein include path selection at the border node determine the optimized internet access path for the associated site. For example, a border node or edge node, when receiving a Map Reply (e.g., Unknown EID Map Reply) for Internet end points (e.g., unknown EID Map reply since Internet destinations are not known to mapping systems) and installing the Map cache can use the following algorithm during the registration/deregistration processes to further optimize its path for Internet access:

```
if (Unknown EID map-reply) {
for (all rlocs in UMR) {
if (rloc == self_rloc) {
new_rloc_list += rloc; /* uses border's direct local routes to internet as this would be fastest */
} else if (rloc's iid == self_iid) {
new_rloc_list += rloc; /* uses edge/border local instance for internet access if its available, avoid
VRF hopping */
} else {
continue;
}
} /* end for loop */
if (new_rloc_list has any local rloc added) {
use this new_rloc list for map-cache;
} else {
use original rloc list in UMR for map-cache;
}
}
```

The above algorithm may analyze whether Internet connectivity is actually present and may be run, for example, at the border in real-time, during registration to inform the LISP control plane, etc. The algorithm can account for whether there is direct Internet connectivity or indirect connectivity (e.g., via a tunnel through a different border in the same site or a different site), as well as other information.

In this way, the Map cache for Internet access will have RLOCs with dynamically adjusted priorities/weights for optimized path, even when multiple RLOCs (PeTRs) are registered at the LISP control plane node using static configured RLOC priorities and weights. Also, with the mechanisms described in FIGS. 2 and 3, optimizing or changing the Internet path would not impact the cross site path.

FIG. 4 is a method 400 in accordance with embodiments presented herein. Method 400 may be implemented at a control plane node in a first site of a multi-site Software-defined network (SDN) fabric. The first site includes at least one endpoint.

Method 400 begins at 402 where the control plane node registers a border node in the first site as a Default Egress Tunnel Router (ETR) for availability of the Internet or an unknown endpoint identifier (EID) reachability path of the first site. At 404, the control plane node receives a request for Internet access for the at least one endpoint. At 406, the control plane node provides a dynamically-selected Internet access route for Internet traffic sent by the at least one endpoint.

Figure 5:
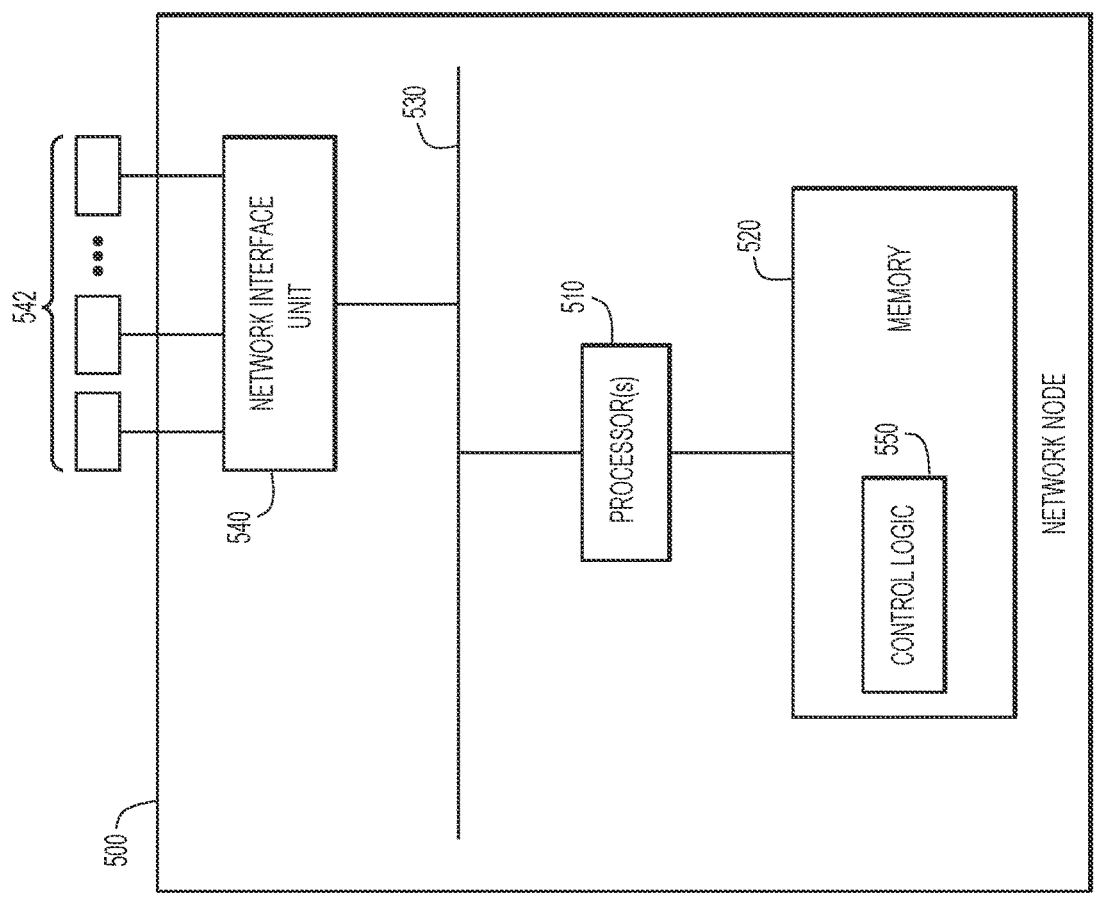
FIG. 5 is a block diagram of a device configured to execute certain operations described with reference to FIGS. 1-4, in accordance in accordance with certain embodiments presented herein.

Reference is now made to FIG. 5. FIG. 5 illustrates a block diagram of a network element (node) 500 configured to perform the operations described above and depicted in connection with FIGS. 1-4. The network element 500 includes one or more processors 510, memory 520, a bus 530 and a network processor unit 540. The processor 510 may be a microprocessor or microcontroller. The network processor unit 540 may include one or more Application Specific Integrated Circuits (ASICs), linecards, etc., and facilitates network communications between the network element 500 and other network nodes.

There are a plurality of network ports 542 at which the network element 500 receives packets and from which the network element 500 sends packets into the network. The processor 510 executes instructions associated with software stored in memory 520. Specifically, the memory 520 stores instructions for control logic 550 that, when executed by the processor 510, causes the processor 510 to perform various operations on behalf of the node 500 as described herein. It should be noted that in some embodiments, the control logic 550 may be implemented in the form of firmware implemented by one or more ASICs as part of the network processor unit 540.

The memory 520 may include read only memory (ROM) of any type now known or hereinafter developed, random access memory (RAM) of any type now known or hereinafter developed, magnetic disk storage media devices, tamper-proof storage, optical storage media devices, flash memory devices, electrical, optical, or other physical/tangible memory storage devices. In general, the memory 520 may comprise one or more tangible (non-transitory) computer readable storage media (e.g., a memory device) encoded with software comprising computer executable instructions and when the software is executed (by the processor 510) it is operable to perform certain network node operations described herein.

Figure 6:
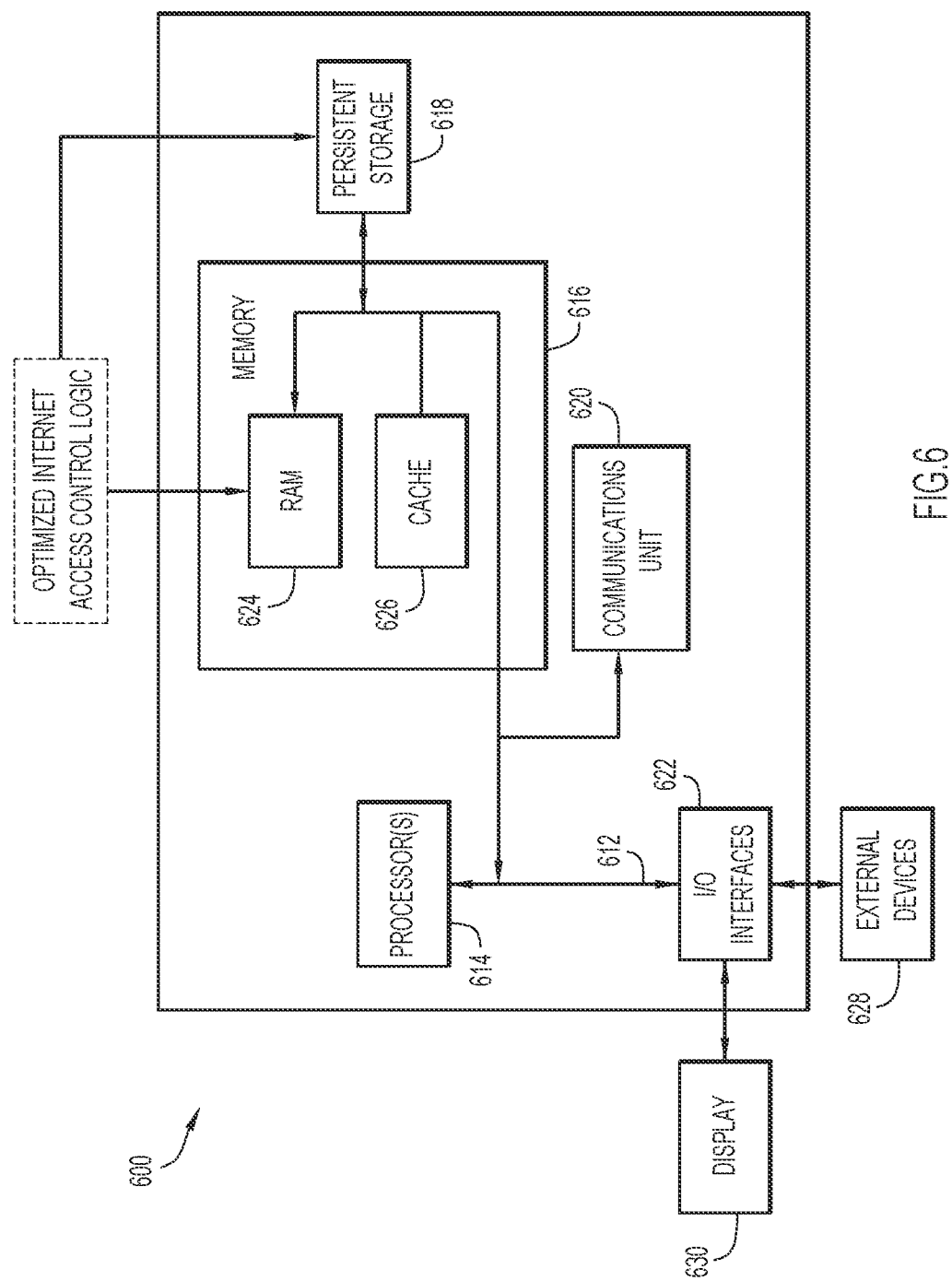
FIG. 6 is a block diagram of a computing/control entity configured to certain operations described with reference to FIGS. 1-4, in accordance in accordance with certain embodiments presented herein.

Reference is now made to FIG. 6. FIG. 6 illustrates a block diagram of a computing/control entity 600 that may perform the functions of the SDN or other computing/control entity referred to herein (e.g., control plane node/MSMR) with reference to FIGS. 1-4. It should be appreciated that FIG. 6 provides only an illustration of one embodiment and does not imply any limitations with regard to the environments in which different embodiments may be implemented. Many modifications to the depicted environment may be made.

As depicted, the computing/control entity 600 includes a bus 612, which provides communications between processor(s) 614, memory 616, persistent storage 618, communications unit 620, and input/output (I/O) interface(s) 622. Bus 612 can be implemented with any architecture designed for passing data and/or control information between processors (such as microprocessors, communications and network processors, etc.), system memory, peripheral devices, and any other hardware components within a system. For example, bus 612 can be implemented with one or more buses.

Memory 616 and persistent storage 618 are computer readable storage media. In the depicted embodiment, memory 616 includes random access memory (RAM) 624 and cache memory 626. In general, memory 616 can include any suitable volatile or non-volatile computer readable storage media. Instructions for the optimized Internet access control logic may be stored in memory 616 or persistent storage 618 for execution by processor(s) 614 (e.g., for operations described with reference to FIGS. 1-4).

One or more programs may be stored in persistent storage 618 for execution by one or more of the respective computer processors 614 via one or more memories of memory 616. The persistent storage 618 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 618 may also be removable. For example, a removable hard drive may be used for persistent storage 618. Other examples include optical and magnetic disks, thumb drives, and smart cards that are inserted into a drive for transfer onto another computer readable storage medium that is also part of persistent storage 618.

Communications unit 620, in these examples, provides for communications with other data processing systems or devices. In these examples, communications unit 620 includes one or more network interface cards. Communications unit 620 may provide communications through the use of either or both physical and wireless communications links.

I/O interface(s) 622 allows for input and output of data with other devices that may be connected to control entity 600. For example, I/O interface 622 may provide a connection to external devices 628 such as a keyboard, keypad, a touch screen, and/or some other suitable input device. External devices 628 can also include portable computer readable storage media such as database systems, thumb drives, portable optical or magnetic disks, and memory cards.

Software and data used to practice embodiments can be stored on such portable computer readable storage media and can be loaded onto persistent storage 618 via I/O interface(s) 622. I/O interface(s) 622 may also connect to a display 630. Display 630 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The present embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In one aspect, a method executed at a control plane node in a first site of a multi-site Software-defined network (SDN) fabric is provided. The method comprises: registering a border node in the first site as a Default Egress Tunnel Router (ETR) for availability of Internet access or an unknown endpoint identifier (EID) reachability path of the first site, wherein the first site includes at least one endpoint; receiving a request for Internet access for the at least one endpoint; and providing a dynamically-selected Internet access route for Internet traffic sent by the at least one endpoint. Providing a dynamically-selected Internet access route for Internet traffic sent by the at least one endpoint may include: determining the dynamically-selected Internet access route based on site-specific Internet access information.

In certain aspects, determining the dynamically-selected Internet access route based on site-specific Internet access information comprises: identifying a plurality of Internet access routes from the first site to access the Internet, wherein each Internet access route has associated pre-configured priority information indicating a static priority for the plurality of Internet access routes; and dynamically reprioritizing the plurality of Internet access routes based on the site-specific Internet access information to identify the dynamically-selected Internet access route for the first site, irrespective of the pre-configured priority information and static priority for the plurality of Internet access routes. An Internet or unknown EID access path may be associated with one or more of Proxy Egress Tunnel Router (PeTR) or routing locator (RLOC) information identifying an Internet Protocol (IP) address of a Proxy Egress Tunnel Router and a virtual instance associated with the Proxy Egress Tunnel Router, and wherein identifying a plurality of Internet access routes may comprise: identifying a plurality of Internet access spanning a plurality of virtual instances. The dynamically-selected Internet access route may be associated with a first virtual instance, and the method further comprises: dynamically changing the dynamically-selected Internet access route to a second Internet access route that is associated with a second virtual instance that is different from the first virtual instance.

In certain aspects, a plurality of Internet access routes from the first site to access the Internet are available, and wherein the site-specific Internet access information includes an indication of whether each of the plurality of Internet access routes is associated with a direct Internet connection from the border node or an indirect Internet connection from the border node. The site-specific Internet access information may include border node status information and/or the site-specific Internet access information may include Operation, administration, and maintenance (OAM) parameters associated with each of plurality of Internet access routes.

In certain aspects, the method further comprises: one or more of deregistering or deprioritizing the border node as the Default Egress Tunnel Router for the unknown endpoint identifier of the first site. In certain aspects, registering the border node in the first site as the Default Egress Tunnel Router for the unknown endpoint identifier of the first site comprises: receiving a MAP registration from the border node, wherein the MAP registration is generated in response to receipt of an external connectivity indicator at the border node. In certain aspects, receiving a request for Internet access for the at least one endpoint comprises: receiving a MAP request for an Internet prefix from an edge node of the first site, wherein the edge node is in communication with the at least one endpoint. In one such aspect, providing the dynamically-selected Internet access route for Internet traffic sent by the at least one endpoint, comprises: providing the dynamically-selected Internet access route to the edge node.

In another aspect, one or more non-transitory computer readable storage media encoded with instructions are provided. When the instructions are executed by a processor of a control plane node in a first site of a multi-site Software-defined network (SDN) fabric, cause the processor to: register a border node in the first site as a Default Egress Tunnel Router (ETR) for availability of Internet access or an unknown endpoint identifier (EID) reachability path of the first site, wherein the first site includes at least one endpoint; receive a request for Internet access for the at least one endpoint; and provide a dynamically-selected Internet access route for Internet traffic sent by the at least one endpoint.

In another aspect, an apparatus is provided. The apparatus comprises: one or more network interfaces; memory; and one or more processors at a control plane node in a first site of a multi-site Software-defined network (SDN) fabric configured to: register a border node in the first site as a Default Egress Tunnel Router (ETR) for availability of Internet access or an unknown endpoint identifier (EID) reachability path of the first site, wherein the first site includes at least one endpoint; receive a request for Internet access for the at least one endpoint; and provide a dynamically-selected Internet access route for Internet traffic sent by the at least one endpoint.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   at a control plane node in a first site of a multi-site Software-defined network (SDN) fabric:
      receiving a request for Internet access for at least one endpoint in the first site;
      dynamically reprioritizing a plurality of Internet access routes from the first site to access an Internet based on Internet access information to identify a dynamically-selected Internet access route for the first site; and
      providing the dynamically-selected Internet access route for Internet traffic sent by the at least one endpoint.

2. The method of claim 1, further comprising:
   identifying the plurality of Internet access routes, wherein each Internet access route of the plurality of Internet access routes has associated pre-configured priority information indicating a static priority for the plurality of Internet access routes,
   wherein dynamically reprioritizing the plurality of Internet access routes includes dynamically reprioritizing the plurality of Internet access routes irrespective of the pre-configured priority information and static priority for the plurality of Internet access routes.

3. The method of claim 2, wherein the Internet or an unknown endpoint identifier (EID) access path is associated with one or more of Proxy Egress Tunnel Router (PeTR) or routing locator (RLOC) information identifying an Internet Protocol (IP) address of a PeTR and a virtual instance associated with the PeTR, and wherein identifying the plurality of Internet access routes comprises:
   identifying a plurality of Internet access routes spanning a plurality of virtual instances.

4. The method of claim 3, wherein the dynamically-selected Internet access route is associated with a first virtual instance, and wherein the method further comprises:
   dynamically changing the dynamically-selected Internet access route to a second Internet access route that is associated with a second virtual instance that is different from the first virtual instance.

5. The method of claim 1, wherein the Internet access information includes an indication of whether each of the plurality of Internet access routes is associated with a direct Internet connection from a border node in the first site or an indirect Internet connection from the border node.

6. The method of claim 1, wherein the Internet access information includes border node status information.

7. The method of claim 1, wherein the Internet access information includes Operation, administration, and maintenance (OAM) parameters associated with each of the plurality of Internet access routes.

8. The method of claim 1, further comprising:
   one or more of deregistering or deprioritizing a border node in the first site as a default Egress Tunnel Router (ETR) for an availability of the Internet access or an unknown endpoint identifier (EID) reachability path of the first site.

9. The method of claim 1, further comprising:
   receiving a map registration from a border node in the first site, wherein the map registration is generated in response to receipt of an external connectivity indicator at the border node.

10. The method of claim 1, wherein receiving the request for the Internet access for the at least one endpoint comprises:
    receiving a map request for an Internet prefix from an edge node of the first site, wherein the edge node is in communication with the at least one endpoint.

11. The method of claim 10, wherein providing the dynamically-selected Internet access route for the Internet traffic sent by the at least one endpoint, comprises:
    providing the dynamically-selected Internet access route to the edge node.

12. One or more non-transitory computer readable storage media encoded with instructions that, when executed by a processor of a control plane node in a first site of a multi-site Software-defined network (SDN) fabric, cause the processor to:
    receive a request for Internet access for at least one endpoint in the first site;
    dynamically reprioritize a plurality of Internet access routes from the first site to access an Internet based on Internet access information to identify a dynamically-selected Internet access route for the first site; and
    provide the dynamically-selected Internet access route for Internet traffic sent by the at least one endpoint.

13. The one or more non-transitory computer readable storage media of claim 12, further comprising instructions that, when executed by the processor, cause the processor to:
    identify the plurality of Internet access routes, wherein each Internet access route of the plurality of Internet access routes has associated pre-configured priority information indicating a static priority for the plurality of Internet access routes; and
    dynamically reprioritize the plurality of Internet access routes irrespective of the pre-configured priority information and static priority for the plurality of Internet access routes.

14. The one or more non-transitory computer readable storage media of claim 13, wherein the Internet or an unknown endpoint identifier (EID) access path is associated with one or more of Proxy Egress Tunnel Router (PeTR) or routing locator (RLOC) information identifying an Internet Protocol (IP) address of a PeTR and a virtual instance associated with the PeTR, and wherein the instructions executed to identify the plurality of Internet access routes comprise instructions that, when executed by the processor, cause the processor to:

identify a plurality of Internet access routes spanning a plurality of virtual instances.

15. The one or more non-transitory computer readable storage media of claim 12, wherein the Internet access information includes an indication of whether each of the plurality of Internet access routes is associated with a direct Internet connection from a border node in the first site or an indirect Internet connection from the border node.

16. The one or more non-transitory computer readable storage media of claim 12, wherein the Internet access information includes border node status information and Operation, administration, and maintenance (OAM) parameters associated with each of the plurality of Internet access routes.

17. An apparatus comprising:
one or more network interfaces;
memory; and
one or more processors at a control plane node in a first site of a multi-site Software-defined network (SDN) fabric configured to:
receive a request for Internet access for at least one endpoint in the first site;
dynamically reprioritize a plurality of Internet access routes from the first site to access an Internet based on Internet access information to identify a dynamically-selected Internet access route for the first site; and
provide the dynamically-selected Internet access route for Internet traffic sent by the at least one endpoint.

18. The apparatus of claim 17, wherein the one or more processors are further configured to:

identify the plurality of Internet access routes, wherein each Internet access route of the plurality of Internet access routes has associated pre-configured priority information indicating a static priority for the plurality of Internet access routes; and dynamically reprioritize the plurality of Internet access routes irrespective of the pre-configured priority information and static priority for the plurality of Internet access routes.

19. The apparatus of claim 18, wherein the Internet or an unknown endpoint identifier (EID) access path is associated with one or more of Proxy Egress Tunnel Router (PeTR) or routing locator (RLOC) information identifying an Internet Protocol (IP) address of a PeTR and a virtual instance associated with the PeTR, and wherein the one or more processors configured to identify the plurality of Internet access routes include one or more processors configured to:

identify a plurality of Internet access routes spanning a plurality of virtual instances.

20. The apparatus of claim 19, wherein the dynamically-selected Internet access route is associated with a first virtual instance, and wherein the one or more processors are further configured to:

dynamically change the dynamically-selected Internet access route to a second Internet access route that is associated with a second virtual instance that is different from the first virtual instance.

* * * * *